(12) United States Patent
Shirazee et al.

(10) Patent No.: US 7,382,103 B2
(45) Date of Patent: Jun. 3, 2008

(54) MAGNETIC GEARING OF PERMANENT MAGNET BRUSHLESS MOTORS

(75) Inventors: Nabeel Ahmed Shirazee, Cardiff (GB); Praveen Choudhary, Cardiff (GB)

(73) Assignee: Electronica Products Limited, Cardiff (GB)

( * ) Notice: Subject to any disclaimer, the term of this patent is extended or adjusted under 35 U.S.C. 154(b) by 0 days.

(21) Appl. No.: 10/576,573

(22) PCT Filed: Oct. 22, 2004

(86) PCT No.: PCT/GB2004/004512
§ 371 (c)(1),
(2), (4) Date: Apr. 18, 2006

(87) PCT Pub. No.: WO2005/043740
PCT Pub. Date: May 12, 2005

(65) Prior Publication Data
US 2007/0024220 A1   Feb. 1, 2007

(30) Foreign Application Priority Data
Oct. 24, 2003   (GB) ................................ 0324785.5

(51) Int. Cl.
*H02P 1/18* (2006.01)
(52) U.S. Cl. ...................... 318/254; 318/599; 318/772; 318/773

(58) Field of Classification Search ................ 318/772, 318/773, 779, 599, 811, 459, 500, 138, 254, 318/439
See application file for complete search history.

(56) References Cited

U.S. PATENT DOCUMENTS

| | | | | |
|---|---|---|---|---|
| 4,737,701 A | * | 4/1988 | Hoemann et al. | 318/772 |
| 5,514,943 A | * | 5/1996 | Shapess | 318/772 |
| 6,097,127 A | | 8/2000 | Rivera | |
| 6,121,746 A | * | 9/2000 | Fisher et al. | 318/772 |
| 6,255,755 B1 | * | 7/2001 | Fei | 310/184 |
| 6,329,783 B1 | * | 12/2001 | Vrionis et al. | 318/772 |
| 6,445,101 B2 | * | 9/2002 | Ley | 310/184 |
| 6,630,764 B1 | | 10/2003 | Dube et al. | |

FOREIGN PATENT DOCUMENTS

| | | |
|---|---|---|
| CA | 2341095 | 10/2001 |
| DE | 10006829 | 8/2001 |

* cited by examiner

*Primary Examiner*—Rina I Duda
(74) *Attorney, Agent, or Firm*—Gordon & Jacobson, PC

(57) ABSTRACT

A permanent magnet brushless 3-phase motor comprises windings R, Y, B, each divided into a plurality of sections 1-5 and switch means S1-S12 for selectively connecting the section of the respective winding e.g. R in series and/or parallel with all other sections of that winding R. Control means are provided for actuating the switch means S1-S12 to connect the winding sections 1-5 in different configurations while the motor is running to alter the speed/torque characteristics of the motor.

17 Claims, 6 Drawing Sheets

|  | SWITCH 1 | SWITCH 2 | SWITCH 3 | SWITCH 4 | SWITCH 5 | SWITCH 6 | SWITCH 7 | SWITCH 8 | SWITCH 9 | SWITCH 10 | SWITCH 11 | SWITCH 12 |
|---|---|---|---|---|---|---|---|---|---|---|---|---|
| FIG 2 | OFF | OFF | OFF | OFF | ON | ON | ON | ON | OFF | OFF | OFF | OFF |
| FIG 3 | ON | OFF | OFF | OFF | OFF | ON | ON | ON | ON | OFF | OFF | OFF |
| FIG 4 | ON | ON | OFF | OFF | OFF | OFF | ON | ON | ON | ON | OFF | OFF |
| FIG 5 | ON | ON | ON | OFF | OFF | OFF | OFF | ON | ON | ON | ON | OFF |
| FIG 6 | ON | ON | ON | ON | OFF | OFF | OFF | OFF | ON | ON | ON | ON |

MAGNETIC GEARING OF PERMANENT MAGNET BRUSHLESS MOTORS

BACKGROUND OF THE INVENTION

1. Field of the Invention

This invention relates to the magnetic gearing of permanent magnet brushless motors.

Permanent magnet brushless motors are known which are capable of providing variable speed outputs. The motor characteristics are linear, generating high torque at low speeds and high speed at low torque levels.

In certain applications, the range of speed and torque characteristics of a particular motor may not be sufficient to cover the desired range, even though the output power of the motor may be sufficient. In such circumstances two options are available. Firstly, a more powerful motor could be used to cover the entire range or secondly, mechanical gears could be provided for the motor. Both of these methods add cost and weight to the system.

2. Related Background Art

Canadian Patent Application No. 2341095 discloses an alternative to the above-mentioned methods which uses a technique in which the speed and torque can be varied inside the motor and the only additional item required is a switching circuit. A prerequisite of this technique is that the stator coils of the motor must be segmented into at least two or more sections, which are evenly or perhaps unevenly distributed throughout the stator slots. The switching circuit can then be used to change the number of coil segments which are connected to the supply. Such an arrangement utilises the control of the induced back electromotive force (back emf) to control the speed by selectively altering the number of conductors which are connected to the supply. This in effect also alters the torque with changing speed of the motor.

In the main embodiment of Canadian Patent Application No. 2341095, each of the motor windings comprises a plurality of series-connected sections provided by tappings in the winding, which can be selectively connected across the supply. With just one of the coil segments connected across the supply, the motor will produce a high speed but a low torque. However, with a higher proportion of coils connected in series across the supply, the motor will produce a lower speed at the same torque. In this manner, the speed but not the torque of the motor can be varied by selectively connecting the windings in series.

In an alternative embodiment, each of the motor windings comprises a plurality of parallel-connected sections, which sections can be selectively connected in parallel across the supply. With just one of the coil segments connected across the supply, the motor will produce a high speed but a low torque as previously described. However, with a higher proportion of coils connected in parallel across the supply, the motor will produce high torque at the same speed. In this manner, the torque but not the speed of the motor can be varied by selectively connecting the windings in parallel.

A disadvantage of either arrangement is that sections are redundant when running the motor during some configurations and thus copper ($I^2R$) losses will be higher because the cross-sectional area of copper utilised decreases as the number of active sections decreases. Also, the presence of redundant sections means that the net resistance of the coils is not optimised in all configurations and hence the supply current or voltage has to be controlled to avoid damaging the connected coils. Since speed and torque are functions of the current, any limitation of the current affects the performance of the motor.

In most situations, the supply current to the motor is limited (for example in domestic mains to 13 amps), and thus the attainable speed and torque will not be optimised when some coils are out of circuit.

We have now devised a permanent magnet brushless motor which alleviates the above-mentioned problem.

SUMMARY OF THE INVENTION

In accordance with this invention, there is provided a permanent magnet brushless motor comprising a winding divided into a plurality of sections and switch means for selectively connecting the sections of the winding in one of a plurality of different configurations, wherein each section is connected in series and/or parallel with all other sections of the winding.

The switch means can then be used to change magnetic gears, by changing the configuration of the coil segments in series, parallel or a combination of both, which are connected to the supply. We call such an arrangement magnetic gearing because it utilises the control of the induced back electromagnetic force (back emf) to control the speed by selectively altering the winding configuration which are connected to the supply. This alters the torque with changing speed of the motor.

In contrast to known methods of varying the speed or torque by coil manipulation, the present invention is distinguished in that all of the winding segments contribute towards the motor operation no matter which section configuration is being employed. In this manner, all of the available copper is utilised at all times, thereby keeping the copper loss of the motor to a minimum.

The advantage of utilising all of the winding sections is the reduction of the motor's copper loss. Normally the stator slots are packed with as much copper wire as possible, either by maximising the number of turns, or by maximising the wire diameter (if the number of turns have been predetermined for the design). In this manner the cross-section area of copper is maximised for the slot, so that the resistance of the coils is kept to a minimum. Hence the copper loss for the motor will always be kept to a minimum.

In a first configuration, the switch means is preferably arranged to connect all of the winding sections in parallel. In this configuration at a given current I, the motor is able to reach high speeds at relatively low torque levels.

In a second configuration, the switch means is preferably arranged to connect all of the winding sections in series. In this configuration at the same current I, the motor is only able to deliver high levels of torque at relatively low speeds.

In a third configuration, the switch means is preferably arranged to connect some of the winding sections in parallel, with at least one other section being connected in series with the parallel-connected sections. In this configuration at the same current, the motor is able to reach speeds between that of the first and second configurations and deliver a torque between the first and second configurations.

In order to further vary the speed v torque characteristic of the motor, the voltage applied to the winding may be pulse-width modulated, for example using said switch means.

The speed v torque characteristic of the motor may also be varied by rapidly switching the winding sections between different configurations to obtain a characteristic intermediate that of the configurations between which the windings are switched.

Preferably the switch means is able to vary the configuration of the winding connections whilst the motor is running, in accordance with predetermined operating parameters.

Preferably, the switch means is able to vary the configuration of the winding connections whilst the motor is running, in accordance with the output of means for sensing an operating parameter of the motor such as the current, voltage, speed or torque, or in accordance with the output of means for sensing an operating parameter of the article being driven by the motor such as velocity. In the case of a multi-phase motor having a plurality of windings, the switch means may vary the configuration of the winding connections of a conducting phase whilst the motor is running, in accordance with the back emf measured across the winding of non-conducting phase or a section thereof.

Alternatively, the switch means is able to vary the configuration of the winding connections in accordance with time or an operating cycle or program.

Alternatively, means may be provided for manually changing the configuration of the winding connections.

Preferably all of the sections of the winding are wound in parallel during assembly, with the current preferably flowing through each section in the same direction.

One of the sections of the winding may comprise a different number of turns from another section. Also, one of the sections of the winding may comprise a conductor having a different cross-sectional area than the conductor of another section.

BRIEF DESCRIPTION OF THE DRAWINGS

An embodiment of this invention will now be described by way of an example only and with reference to the accompanying drawings, in which.

DETAILED DESCRIPTION OF THE PREFERRED EMBODIMENTS

Figure 1:
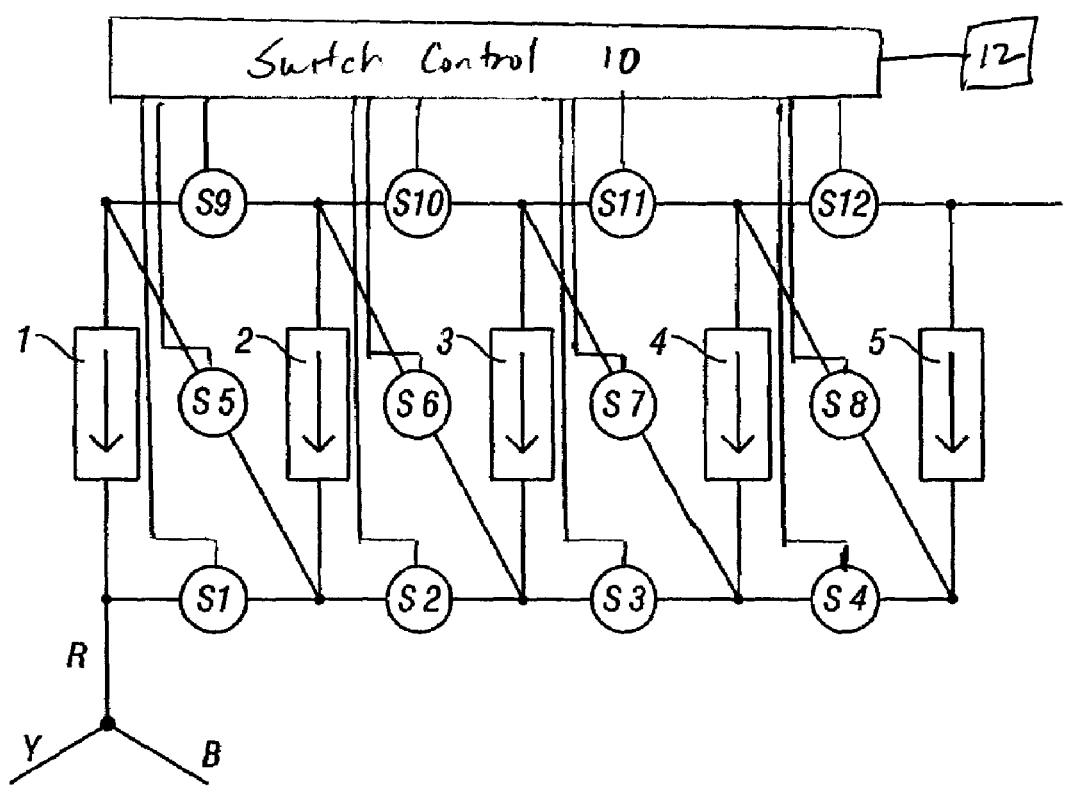
FIG. 1 is a schematic diagram of one phase of a 3-phase permanent magnet brushless motor in accordance with the present invention.

Referring to FIG. 1 of the drawings, there is shown a 3-phase permanent magnet brushless DC motor comprising three star-connected phases R, Y, B 18 slots, 12 poles and a slot pitch of 1. The stator outer diameter, inner diameter and length are 110 mm, 55 mm and 75 mm, respectively. The air gap is 0.5 mm, the magnet width and thickness are 10 mm and 4 mm, respectively.

Each phase comprises a winding having, for example, five conductors or so-called sections 1-5 of 0.63 mm enamelled copper which are co-wound in parallel through the relevant stator slots of the motor. The supply voltage to the motor is 180 volts DC.

The first end of the first section 1 of one phase R is connected to the first ends of the first sections of the other two phases Y, B. The first end of the first section of the phase R is also connected to the first end of the second section 2 of that phase R via a switch SI. Likewise, the first ends of the other sections 3, 4, 5 are connected to adjacent sections via respective switches S2, S3, S4.

Similarly, the second end of the first section 1 of the phase R is connected to the second end of the second section 2 of that phase R via a switch S9. Likewise, the second ends of the other sections 3, 4, 5 are connected to adjacent sections via respective switches S10, S11, S12. The second end of the fifth section 5 is also connected to the supply.

The second end of the first section 1 of the phase R is connected to the first end of the second section 2 of that phase R via a switch S5. Likewise, the second ends of the other sections 2, 3, 4 are connected to the first ends of adjacent sections via respective switches S6, S7, S8.

Figure 2:
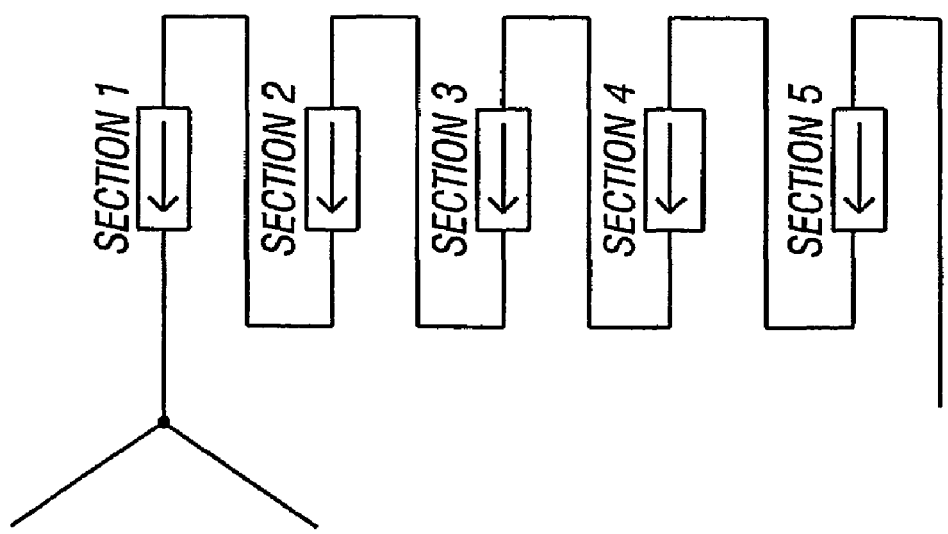
FIGS. 2 to 6 are schematic diagrams showing various connections of sections of the motor of FIG. 1.
Figures 6, 7:
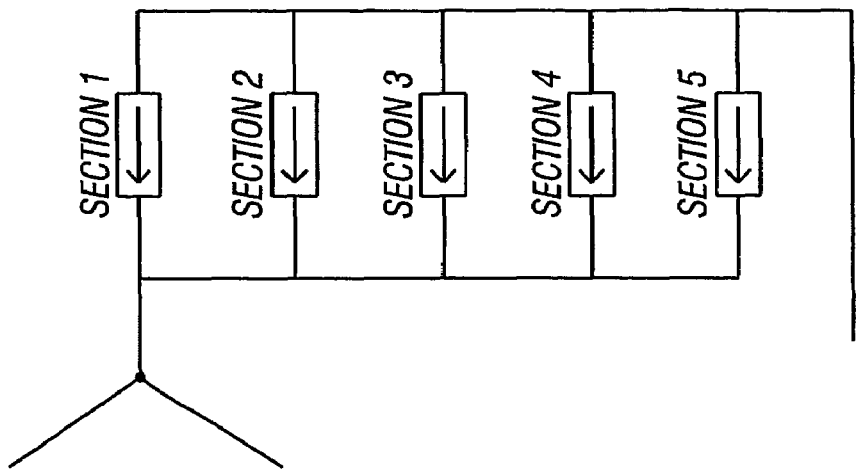
FIG. 7 is a table showing the switch states of the motor of FIG. 1 with reference to the connections of FIGS. 2 to 6.
Figure 8:
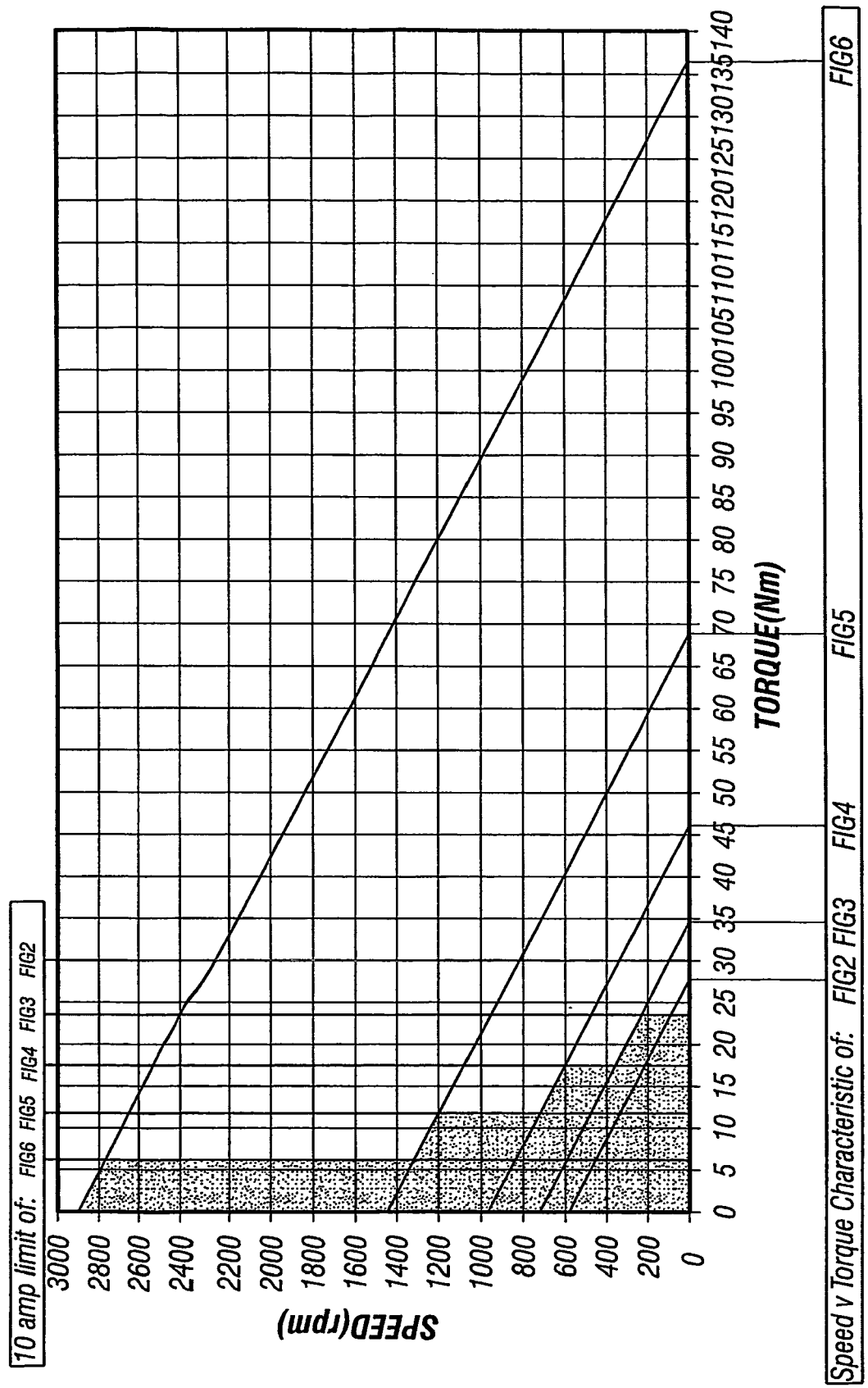
FIG. 8 is a graph of speed v torque for the connections of FIGS. 2 to 6.

Referring to FIGS. 2, 7 and 8 of the drawings, when the motor is initially started, only the switches S5 to S8 are energised such that the sections 1-5 are connected in series.

In this manner the supply current flows through each series-connected section 1-5 in the same direction with respect to each section's polar orientation (as indicated by the arrows in FIG. 1): it is imperative that this is always the case.

Had one of the sections (e.g. section 4) been oriented in the opposite direction, the flux produced by section 4 would oppose the flux produced by sections 1, 2, 3 and 5.

The torque of the motor is directly proportional to the current and, as long as the starting torque is high enough to overcome the load attached to the motor, the rotor begins to turn. This is accompanied by the generation of a back emf in the coils, which begins to cancel out the supply voltage, so that the current available for the phase coils begins to reduce, as does the torque produced by the motor.

The back emf, is directly proportional to the number of turns in the phase coils, the magnetic flux produced by the permanent magnets, the number of permanent magnet pole pairs and the angular speed of the rotor. Other factors, such as the interconnection between the coils and the phases and the number of phases also affects the back emf generated.

The consequence of this behaviour is that, the motor will continue to accelerate until the torque produced by it, equals the load. From this point on, the motor will continue to rotate at a constant speed. If at any instance the load is altered, the motor will automatically adjust its torque (and consequently, its speed) in order to balance the load.

The maximum speed that can be attained by a motor, occurs when there is no load attached to the motor. Ideally, this occurs when the back emf generated in the phase coils is equal to the supply voltage, at which instance there is no current flowing through the coils to produce any torque; this situation is referred to as the no load speed.

In reality, the back emf will always remain marginally lower than the supply voltage (even at no load speed). This is because a small portion of power supply is used up in overcoming frictional forces due to windage and the bearings, as well as iron losses of the motor.

It is evident from the graph of FIG. 8 that the motor is limited to performance criteria within the speed v torque line for FIG. 2. The graph indicates that the motor can manage a maximum speed of 584 rpm and a maximum torque of 28.1 Nm. As a further example, it can also provide torque of 8 Nm up to a maximum speed of approximately 400 rpm, or conversely, the motor running at 400 rpm, can provide up to a maximum torque of approximately 8 Nm.

If the desired motor performance falls beyond the 10 amp line, for instance 14 Nm at 600 rpm, the motor parameters need to be altered in order to cater for the additional power requirements.

Figure 3:
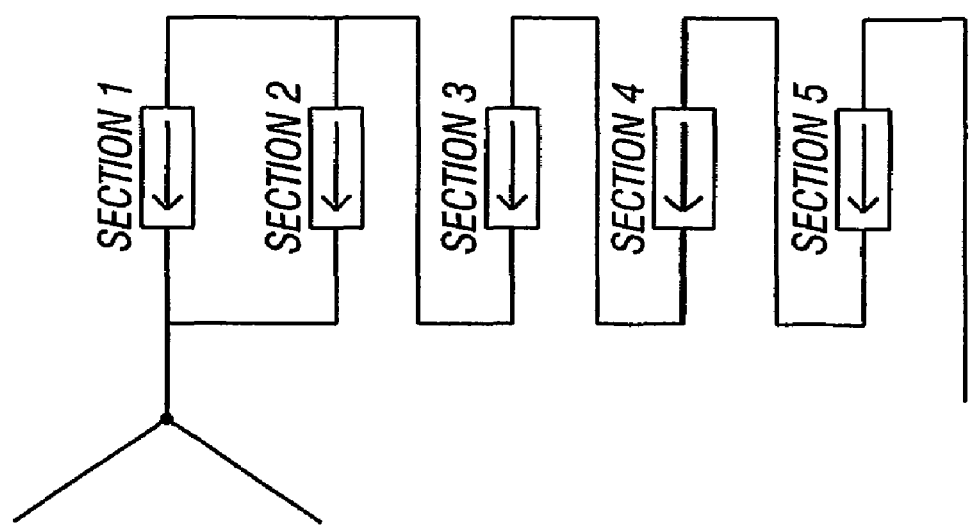

Referring to FIGS. 3, 7 and 8 of the drawings, the motor's performance can be changed by altering the configuration in which all of the motor's windings are connected. By energising the switches in accordance with FIG. 7, sections 1 and 2 can be connected in parallel and this parallel set is then connected in series with section 3, 4 and 5 (which are connected in series with one another).

It is evident from the graph of FIG. 8 that the motor is now limited to performance criteria within the speed v torque line for FIG. 3. The graph indicates the motor will now generate a no load speed of 725 rpm and a stall torque of 34.6 Nm.

Figure 4:
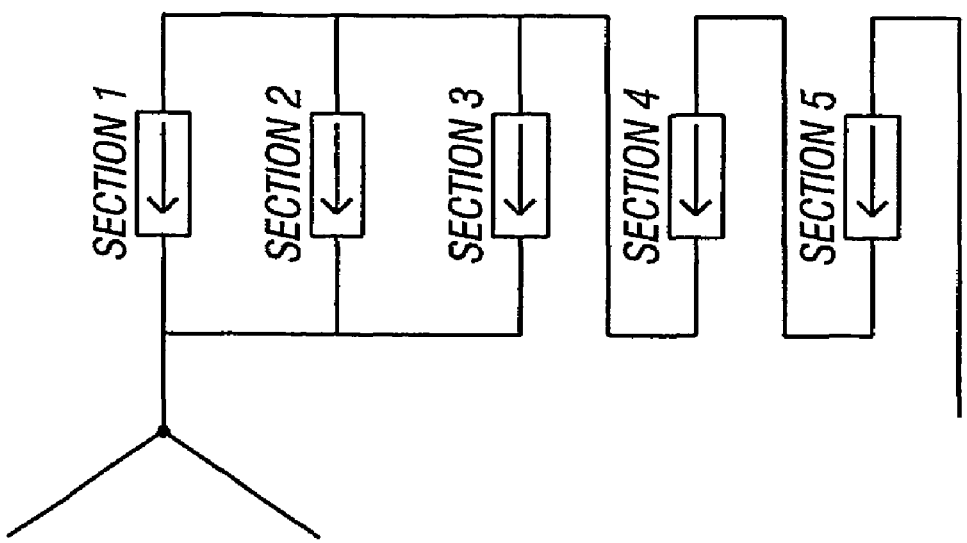

Referring to FIGS. 4, 7 and 8 of the drawings, the motor's performance can be changed again by energising the switches in accordance with FIG. 7, so that sections 1, 2 and 3 are connected in parallel and this parallel set is then connected in series with sections 4 and 5 (which are connected in series with one another).

It is evident from the graph of FIG. 8 that the motor is now limited to performance criteria within the speed v torque line for FIG. 4. The graph indicates the motor will now generate a no load speed of 966 rpm and a stall torque of 46.1 Nm.

Figure 5:
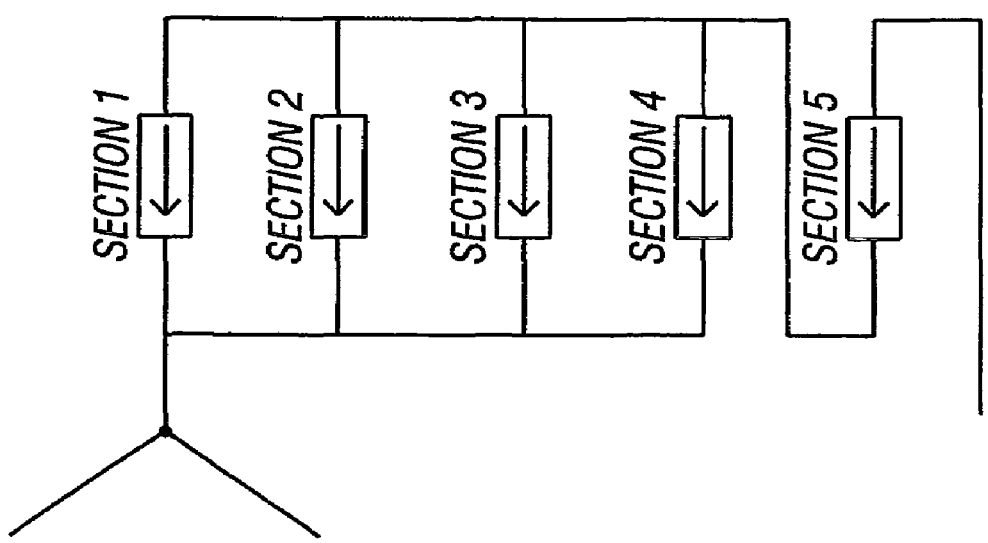

Referring to FIGS. 5, 7 and 8 of the drawings, the motor's performance can be changed again by energising the switches in accordance with FIG. 7, so that sections 1,2, 3 and 4 are connected in parallel and this parallel set is then connected in series with section 5.

It is evident from the graph of FIG. 8 that the motor is now limited to performance criteria within the speed v torque line for FIG. 5. The graph indicates the motor will now generate a no load speed of 1449 rpm and a stall torque of 69.0 Nm.

Referring to FIGS. 6,7 and 8 of the drawings, the motor's performance can finally be changed by energising the switches in accordance with FIG. 7, so that sections 1,2, 3,4 and 5 are connected in parallel.

It is evident from the graph of FIG. 8 that the motor is now limited to performance within the speed v torque line for FIG. 6. The graph indicates the motor will now generate a no load speed of 2898 rpm and a stall torque of 136.7 Nm.

At first sight, one may consider that the best option would be to implement the configuration of FIG. 6 (i.e. all sections in parallel), since this choice yields the greatest range in terms of both speed and torque. However, although the voltage supplied to all of the configurations is the same (180 volts DC), the current varies from one configuration to the next. In practical applications there will always be a current limit, for example most household appliances are limited to 13 amps. Referring to FIG. 8, if a notional 10 amp limit is applied to each configuration, it will be seen that the maximum torque achievable by the configuration of FIGS. 2 to 6 are 29.7, 23.7, 17.8, 11.9 and 5.9 Nm respectively. Thus, by operating the switches to change between the various configurations, whilst keeping the motor within the confines of the 10 amp limit, a performance can be achieved as shown in the shaded area of the graph. Accordingly, it will be appreciated that a gearing system for the motor can be provided by operating the switches, thereby allowing the motor to generate higher torque (at low speed) and higher speed (with low torque) than would be possible with any single configuration (with limited current supply). Thus, when the motor is initially energised, all sections can be connected in series as shown in FIG. 2, such that a high starting torque is achieved well within the confines of the 10 amp limit.

The switches S1 to S12 can be relays or semiconductor devices. In the case of semiconductor devices, a plurality of devices could be included in a single package. Individual switches for example S1, S5 and S9 can be configured into a single mechanical or electronic switch. In this case when 1 and 9 are ON, then 5 is OFF. When 5 is ON, then 1 and 9 are OFF.

This way only 4 switches will be required per phase instead of 12 switches.

Figure 9:
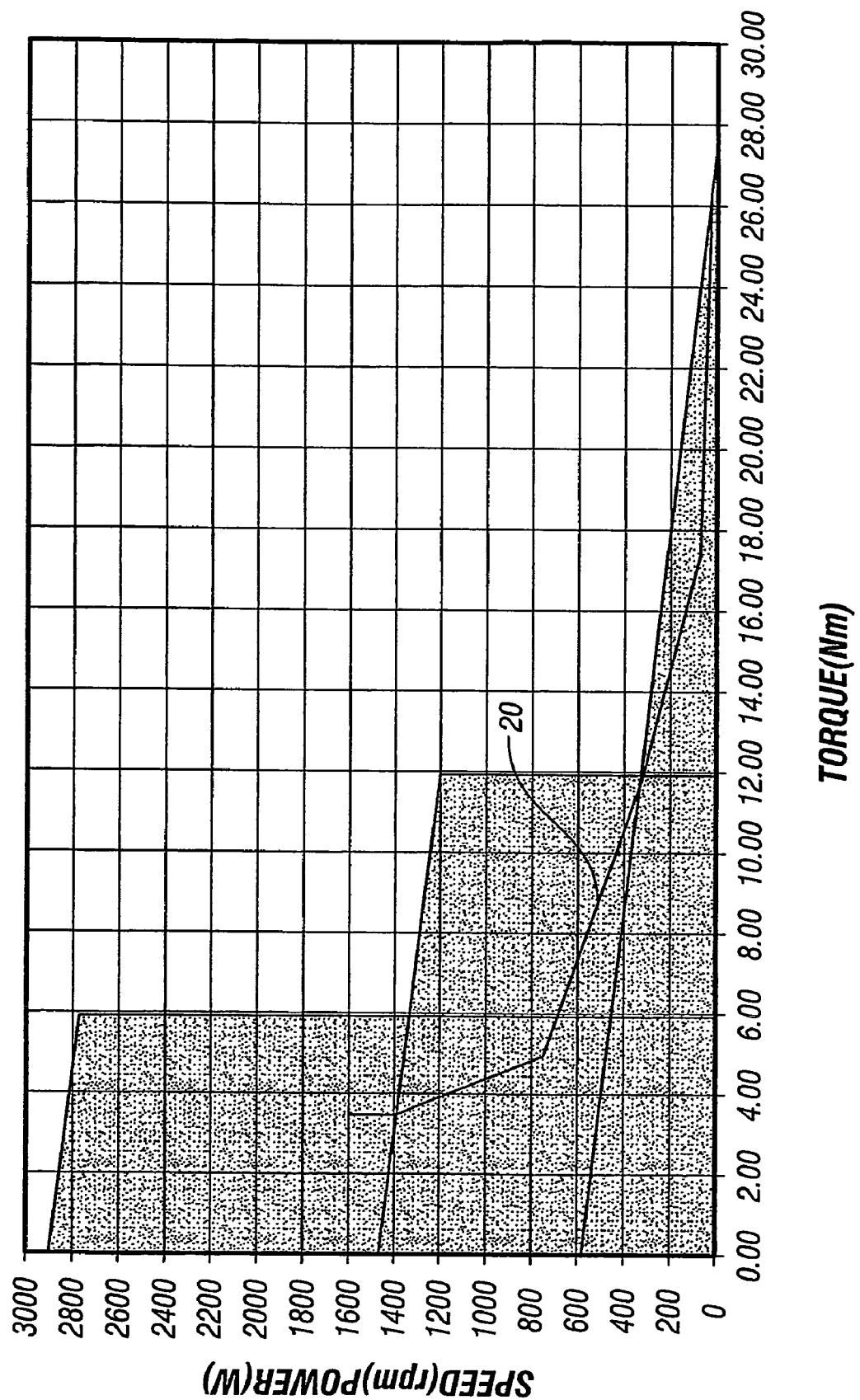
FIG. 9 is graph of speed v torque to illustrate how the ideal motor characteristics for a washing machine can be achieved using the motor of FIG. 1.

Referring to FIG. 9 of the drawings, there is shown a graph of the required speed v torque curve 20 for a domestic washing machine superimposed onto the graph of FIG. 8. At present the required speed and torque are normally achieved by using induction motors running at high speeds with appropriate mechanical gearing and drive belts, or by using a large DC direct drive motor. However, it can be seen that the required range of speed and torque can easily be achieved within the current confines using a reasonably sized direct drive brushless DC motor in accordance with this invention.

It will be seen that the configurations of FIGS. 3 and 4 are not necessary to provide the required speed v torque curve for a domestic washing machine and thus some cost savings can be achieved by omitting some of the switches.

It should be noted that the multi-segmented coils within a single phase need not be wound using the same wire diameter or the same number of turns, however, all the phases must be wound in an identical manner. For instance, section 1 of every phase must be wound with the same wire and have the same number of turns. Coil section 2 can have a different number of turns and it can be wound using a different wire diameter to that of section 1, but coil segment 2 of every phase must be identical and the same applies to all other segments.

It will be appreciated that whilst the embodiment hereinbefore described utilises 3-phases, the invention applies to a motor having any number of phases. Furthermore, the invention also applies to permanent magnet brushless synchronous motors, which have similar speed torque characteristics.

The configurations discussed in FIGS. 2 to FIG. 6 are not the only possible combinations. For example, another possible combination is coil sections 1 and 2 connected in parallel and coil sections 3 and 4 connected in parallel, the two parallel sets being connected in series with one another and with the remaining section 5. This configuration will produce the same motor characteristics as the arrangement shown in FIG. 4.

Yet another configuration can be obtained by connecting sections 1,2 and 3 in parallel and sections 4 and 5 in parallel and then connecting the parallel sets in series with one another. This will yield motor characteristics that are the same as the one produced by the configuration shown in FIG. 5.

The number of speed-torque characteristics that can be obtained is dependent on the number of winding sections provided (per phase), which is limited to some finite number.

The motor operates at its most efficient level when it is running as close as possible to its no load speed. For this reason, it is undesirable to allow the motor to compensate for an increase in load, by automatically reducing its speed (on the speed-torque characteristics line). It would be far better to meet the demands of the increase in load through magnetic gearing, so that the new torque level is achieved whilst the motor continues to run close to its no load speed. However, in order to meet all possible torque levels (within the given range of the motor) the motor would require an infinite number of magnetic gears and therefore, an infinite number of winding sections and switches.

In an alternative embodiment, it is possible to achieve any speed torque curve in between those obtained by altering the configuration of the windings by interchanging between the two configurations very rapidly, so that the motor is not operating at the characteristics of either configuration, but somewhere in between. The rapid switching between the two configurations can be achieved by a switch control unit 10 that feeds a pulse width modulated (PWM) signal to the switches (S1 to S12) as shown in FIG. 1. The duty cycle of the PWM signal is altered to achieve the desired intermediate speed and torque. The control unit 10 can vary the switching between configurations whilst the motor is running in accordance with an operating parameter of the motor as output by a sensor 12 as shown in FIG. 1.

For example, consider a first configuration with all winding sections connected in parallel; this gear provides the highest speed the motor can achieve and therefore, it is the highest gear. The next gear down from this, is achieved by connecting one of the winding sections in series with the remaining parallel sections; this provides the next highest speed.

If the PWM has a duty cycle of 100%, the gear will change from the highest to the next lower gear and remain there. Conversely, if a duty cycle of 0% (i.e. no signal) is chosen, the motor will remain in the highest gear. Choosing a duty cycle between 0 and 100% will yield a gear and consequently, a motor speed and torque between the highest two gears; i.e. an intermediate gear.

If desired, the gearing can be switched directly between the highest gear (all sections in parallel) and the lowest gear (all sections in series). The duty cycle of the PWM can then be used to select a speed/torque characteristics anywhere in between the two extremes of the motor performance.

However, the resolution and consequently, the accuracy with which a desired speed can be achieved decreases as the full range of the gearing scale increases. This, to some extent can be compensated by increase in PWM frequency.

While the preferred embodiments of the invention have been shown and described, it will be understood by those skilled in the art that changes of modifications may be made thereto without departing from the true spirit and scope of the invention.

The invention claimed is:

1. A permanent magnet brushless motor comprising:
   a stator comprising one or more phases, wherein at least one given phase of the stator includes a plurality of winding sections;
   a rotor rotatably mounted relative to the stator and comprising at least one permanent magnet; and
   switch means comprising a plurality of switching devices for simultaneously connecting all of the winding sections of the given phase in one of a plurality of different configurations, wherein said switching devices are disposed at opposite ends of each winding section and are arranged to connect each winding section in series and/or parallel with all other winding sections of the given phase.

2. A permanent magnet brushless motor as claimed in claim 1, wherein:
   the switch means is arranged to connect all of the winding sections of the given phase in parallel.

3. A permanent magnet brushless motor as claimed in claim 1, wherein:
   the switch means is arranged to connect all of the winding sections of the given phase in series.

4. A permanent magnet brushless motor as claimed in claim 1, wherein:
   the switch means is arranged to connect some of the winding sections of the given phase in parallel, with at least one other winding section of the given phase being connected in series with the parallel-connected winding sections.

5. A permanent magnet brushless motor as claimed in claim 1, wherein:
   the voltage applied to the winding sections of the given phase is pulse-width modulated.

6. A permanent magnet brushless motor as claimed in claim 5, wherein:
   the voltage applied to the winding sections of the given phase is pulse-width modulated by selectively energising said switch means.

7. A permanent magnet brushless motor as claimed in claim 1, further comprising:
   means for repeatedly actuating said switch means to change said winding sections between different connection configurations to obtain a motor characteristic intermediate that of the connection configurations between which the winding sections are repeatedly switched.

8. A permanent magnet brushless motor as claimed in claim 1, further comprising:
   control means for actuating the switch means to vary the connection configuration of the winding sections whilst the motor is running, in accordance with predetermined operating parameters.

9. A permanent magnet brushless motor as claimed in claim 8, wherein:
   the control means is adapted to vary the connection configuration of the winding sections whilst the motor is running, in accordance with the output of means for sensing an operating parameter of the motor.

10. A permanent magnet brushless motor as claimed in claim 8, wherein:
    the control means is adapted to vary the connection configuration of the winding sections whilst the motor is running, in accordance with the output of means for sensing an operating parameter of the article being driven by the motor.

11. A permanent magnet brushless motor as claimed in claim 8, wherein:
    the control means is adapted to vary the connection configuration of the winding sections of a conducting phase whilst the motor is running, in accordance with the back emf measured across a non-conducting phase or a winding section thereof.

12. A permanent magnet brushless motor as claimed in claim 8, wherein:
    the control means is adapted to vary the connection configuration of the winding sections whilst the motor is running, in accordance with time or an operating cycle or program.

13. A permanent magnet brushless motor as claimed in claim 8, wherein:
    the control means comprises means for manually changing the connection configuration of the winding sections.

14. A permanent magnet brushless motor as claimed in claim 1, wherein:
    all of the winding sections of the given phase are wound in parallel to each other.

15. A permanent magnet brushless motor as claimed in claim 1, wherein:

the winding sections of the given phase are connected such that current flows through each winding section in the same direction.

16. A permanent magnet brushless motor as claimed in claim 1, wherein:

one of the winding sections of the given phase comprises a different number of turns from another winding section of the given phase.

17. A permanent magnet brushless motor as claimed in claim 1, wherein:

one of the winding sections of the given phase comprises a conductor having a different cross-sectional area than the conductor of another winding section of the given phase.

\* \* \* \* \*